G. CLAUDE.
APPARATUS FOR EFFECTING EXOTHERMIC CHEMICAL SYNTHESES AT HIGH TEMPERATURE AND PRESSURE.
APPLICATION FILED FEB. 2, 1920.
1,371,299.
Patented Mar. 15, 1921.
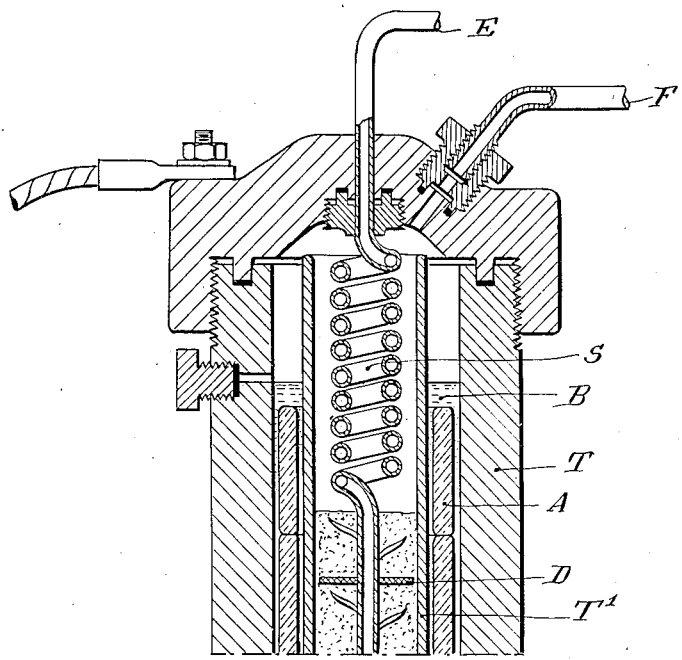
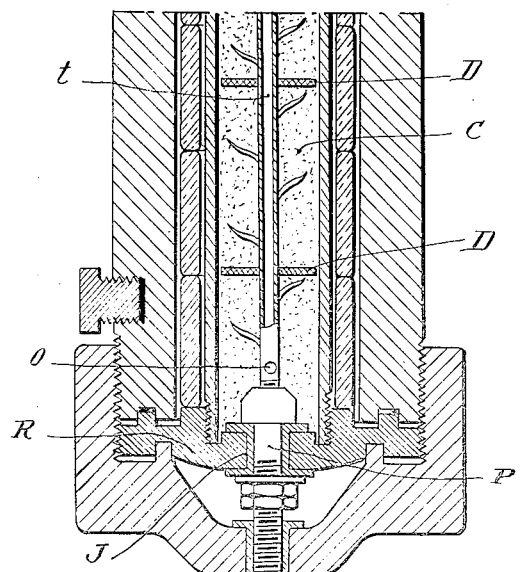

UNITED STATES PATENT OFFICE.

GEORGES CLAUDE, OF PARIS, FRANCE, ASSIGNOR TO SOCIETE L'AIR LIQUIDE SOCIETE ANONYME POUR L'ETUDE ET L'EXPLOITATION DES PROCEDES GEORGES CLAUDE, OF PARIS, FRANCE.

APPARATUS FOR EFFECTING EXOTHERMIC CHEMICAL SYNTHESES AT HIGH TEMPERATURE AND PRESSURE.

1,371,299.     Specification of Letters Patent.     Patented Mar. 15, 1921.

Application filed February 2, 1920. Serial No. 355,871.

*To all whom it may concern:*

Be known that I, GEORGES CLAUDE, a citizen of the Republic of France, residing at Paris, France, have invented certain new and useful Improvements in Apparatus for Effecting Exothermic Chemical Syntheses at High Temperature and Pressure; and I do hereby declare the following to be a full, clear, and exact description of the invention, such as will enable others skilled in the art to which it appertains to make and use the same.

This invention relates to exothermic chemical synthesis at high temperature and pressure and particularly to apparatus in which reactions of this character may be safely effected.

It is essential in conducting synthesis at high temperature and pressure, and particularly in the synthesis of ammonia at pressures ranging from 400 to 2000 atmospheres, called hyper-pressures in application Serial No. 222,502, filed March 14, 1918, that the wall of the reaction chamber which sustains the pressure be subjected only to relatively low temperature, thereby preserving the necessary mechanical resistance, and that this wall be also protected from destructive action of the gases.

In another application Serial No. 317,322, filed Aug. 13, 1919, I have described for the purpose of protecting the chamber wall, a shield of poor heat conductivity, consisting of a liquid containing solids which are adapted to render the liquid less mobile, the solids being in granular or pulverulent condition and mixed with the liquid.

The object of the present invention is the provision of an apparatus for the purpose defined in which the pressure resisting wall is even more effectively protected from the heat of the reaction, with attendant advantages in the commercial application of methods of chemical synthesis.

A further object of my invention is the provision of an apparatus in which heat is most effectively applied to initiate or maintain the reaction when required and in which the heat evolved by the reaction is readily transmitted to incoming gases, thus insuring continuous and efficient operation.

These and other objects and advantages of my invention will be apparent as it is better understood by reference to the following specification when read in connection with the accompanying drawing, in which I have illustrated diagrammatically a form of my apparatus without limiting the invention to exact details thereof.

In accomplishing the desired objects I employ as a heat insulation for the pressure sustaining wall of the chamber, a liquid in which solid bodies with low heat conductivity are immersed, but instead of using bodies in granular or pulverulent form as in the earlier application, I provide a tube or a plurality of superposed rings forming a tube which uniformly opposes movements of the liquid or of gases therein. Several tubes concentrically arranged may be beneficially used although a single tube serves effectively to accomplish the desired result.

Moreover, in the present apparatus a tube placed axially in the apparatus and traversing the catalytic material, conveys the incoming gases which are thus warmed progressively and prior to contact with the catalytic material, by heat interchange with the outgoing gases. I employ this axial tube, moreover, as a conductor for the electric current for necessary heating in initiating or maintaining the reaction, and I provide on this tube projections which conveniently support the catalytic material.

Referring to the drawing, the reaction is carried on within a steel tube T, preferably arranged vertically. The tube T sustains the pressure and is sufficiently thick, therefore, to provide the requisite strength. An inner and lighter tube $T_1$, is separated from the tube T by space for the heat insulating means, consisting of a tube or pile of rings or sections A of heat insulating material, immersed in a molten body B which is stable and non-volatile. In the case of ammonia synthesis, this body may be, for example, a mixture of caustic potash and soda and the rings may be magnetic oxid of iron. The upper end of $T_1$ is free to permit expansion and contraction relative to T, while the other end is supported in a collar R forming a tight joint. The tube $T_1$ contains the catalytic material C.

The gas, previously compressed to the desired pressure, enters through a pipe E which is coiled within the tube $T_1$ to form a heat exchanger S and continues through an axial tube $t$ forming an extension of the coil. The gas escapes through an orifice O and passes through and in contact with the catalytic material, leaving the apparatus by a pipe F, after giving up its heat to the entering gas. The axial tube is arranged to serve as an electric resistance heater supplied with current by a conductor P which is supported in an insulated joint J. The other pole is the body of the apparatus, causing no inconvenience because of the low voltage required, while it facilitates greatly the insulating conditions of the electrical connections.

To avoid release of the greater portion of the heat provided by the electric current in the coil S, the latter may be constructed of metal which is a better conductor and thicker than the remainder of the tube $t$, or the projections may be short circuited by a metallic rod soldered thereto, a construction which has, however, the disadvantage of suppressing the flexibility of the coil necessary to permit expansion and contraction of the tube. Furthermore, the axial tube is provided with projections, secured, for example, by solder which act like barbed wire whereby it is possible to introduce the catalytic material, mixed or not with asbestos, without settling and to support it without agglomeration. Flat disks D of pottery or porcelain are arranged in spaced relation between the projections to prevent short circuits.

In employing the apparatus herein described in the synthesis of ammonia under hyper-pressures, according to application Serial No. 222,502, the previously compressed gaseous atmosphere which fills the tube, permits the use of high electric current densities. Because of this fact and of the velocity of the gas current which circulates in the axial tube $t$, it is possible to expend in the latter tube in spite of its small size, a considerable power, equal to or greater than the calorific power which will be developed by the reaction, for example, three kilowatts per meter of a tube 12 mm. in diameter. The flow of heat toward the exterior, and consequently the drop in temperature across the thermally protecting bed, has then, from the beginning, its full value. This condition is important for the tube T is thus brought to its normal condition of functioning without having at a single instant to be submitted to the temperature of the reaction chamber, as would be the case if the conditions of initiating the reaction were obtained by the use of a slight electric power, increasing progressively the temperature and causing in the protecting shield only a small drop of the increased temperature since this drop is proportional to the flow of heat. As soon as the necessary temperature is reached, I suppress the current and the heat of the reaction thereafter sustains it.

The use of this apparatus presents still other advantages when the insulating shield may be a molten body which is solid at ordinary temperatures. An intense heat being released since the very beginning of working from one end to another of the tube, a liquid film can form at the very beginning from one end to the other of the pressure sustaining wall and prevent local pressures from developing in the mass with the danger of causing cracking of the tube T, as would be the case with a wall which remained solid throughout its length.

Finally the use of an axial tube for carrying the gas to the catalytic material greatly diminishes the section which would partly be ineffective in an apparatus where this carrier would be otherwise arranged.

Various changes may be made in the form, arrangement and construction of the apparatus without departing from the invention or sacrificing any of its advantages.

I claim:

1. In an apparatus for effecting chemical syntheses at high temperature and pressure, the combination of a pressure resisting wall, an inner wall spaced from said pressure resisting wall and forming a reaction chamber, and heat insulating means between said walls including a body of liquid and a tube of insulating material immersed in said liquid.

2. In an apparatus for effecting chemical syntheses at high temperature and pressure, the combination of a pressure resisting wall, an inner wall spaced from said pressure resisting wall and forming a reaction chamber, and heat insulating means between said walls including a body of liquid and a tube of insulating material immersed in said liquid, said tube comprising a plurality of superposed sections.

3. In an apparatus for effecting chemical syntheses at high temperature and pressure, the combination of a pressure resisting wall, an inner wall spaced from said pressure resisting wall and forming a reaction chamber, and heat insulating means between said walls including a molten mass of caustic potash and soda and a tube of magnetic iron oxid immersed in said mass.

4. In an apparatus for effecting chemical syntheses at high temperature and pressure, the combination of a pressure resisting wall, an inner wall spaced from said pressure resisting wall and forming a reaction chamber, heat insulating means between said walls, an outlet for gases from said chamber, a tube extending axially through said chamber and delivering the reacting gases to said chamber and means for delivering electric current to said tube whereby it serves as a heating element for the reaction.

5. In an apparatus for effecting chemical syntheses at high temperature and pressure, the combination of a pressure resisting wall, an inner wall spaced from said pressure resisting wall and forming a reaction chamber, heat insulating means between said walls, an outlet for gases from said chamber, and a tube extending axially through said chamber and delivering the reacting gases to said chamber, said tube being coiled adjacent said outlet to permit heat interchange between incoming and outgoing gases and serving as a heating element for the reaction.

6. In an apparatus for effecting chemical syntheses at high temperature and pressure, the combination of a pressure resisting wall, an inner wall spaced from said pressure resisting wall and forming a reaction chamber, heat insulating means between said walls, an outlet for gases from said chamber, a tube extending axially through said chamber and delivering the reacting gases to said chamber, a body of catalytic material in said chamber and means on said tube to support said catalytic material.

7. In an apparatus for effecting chemical syntheses at high temperature and pressure, the combination of a pressure resisting wall, an inner wall spaced from said pressure resisting wall and forming a reaction chamber, heat insulating means between said walls, an outlet for gases from said chamber, a tube extending axially through said chamber and delivering the reacting gases to said chamber, a body of catalytic material in said chamber, a plurality of projections on said tube to support said material and means for delivering an electric current to said tube whereby it serves as a heating element for the reaction.

8. In an apparatus for effecting chemical syntheses at high temperature and pressure, the combination of a pressure resisting wall, an inner wall spaced from said pressure resisting wall and forming a reaction chamber, heat insulating means between said walls including a liquid body and a tube of insulating material immersed in said liquid, an outlet for gases from said chamber, a tube extending axially through said chamber and delivering the reacting gases to said chamber, a body of catalytic material in said chamber, a plurality of projections on said tube to support said material and means for delivering an electric current to said tube whereby it serves as a heating element for the reaction.

In testimony whereof I affix my signature.

GEORGES CLAUDE.